United States Patent [19]

Morandi

[11] Patent Number: 5,268,242

[45] Date of Patent: Dec. 7, 1993

[54] BATTERY OF NICKEL-HYDROGEN STORAGE CELLS

[75] Inventor: José Morandi, Rosny Sous Bois, France

[73] Assignee: Saft, Romainville, France

[21] Appl. No.: 877,108

[22] Filed: May 1, 1992

[30] Foreign Application Priority Data

May 3, 1991 [FR] France .................. 91 05461

[51] Int. Cl.⁵ .............................................. H01M 2/10
[52] U.S. Cl. ....................................... 429/99; 429/159
[58] Field of Search ........................... 429/96, 99, 159

[56] References Cited

U.S. PATENT DOCUMENTS

| | | | |
|---|---|---|---|
| 1,606,391 | 11/1926 | Schulte ............................. | 429/99 |
| 2,209,927 | 7/1940 | Nichols ............................. | 429/159 |
| 3,178,317 | 4/1965 | Maddaloni ........................ | 429/99 |
| 4,420,545 | 12/1983 | Meyer et al. .................... | 429/101 |
| 5,034,290 | 7/1991 | Sands et al. .................... | 429/159 X |

FOREIGN PATENT DOCUMENTS 8815962  2/1989  Fed. Rep. of Germany .

OTHER PUBLICATIONS

Proceedings of the European Space Power Conference-ESA SP-294-Oct. 2-6, 1989, Madrid, Spain, vol. 1, Aug. 1989, pp. 193-199; B. D. Cox: "The Ground Testing of Nickel Hydrogen Batteries Prior to Launch".
Journal of Power Sources, vol. 18, No. 2-3, Aug. 1986, Lausanne, Switzerland, pp. 245-256; J. R. Metcalfe: "Lightweight, Direct Radiating Nickel-Hydroxy Batteries".
21st Intersociety Energy Conversion Engineering Conference-San Diego, alif. Aug. 25-29, 1986, pp. 1541-1546; D. W. Wong et al: "Intelsat Vi Nickel-Hydrogen Battery".
21st Intersociety Energy Conversion Engineering Conference-San Diego, Calif. Aug. 25-29, 1986, pp. 1527-1530; M. J. Mackowski: "A Low Earth Orbit Nickel Hydrogen Battery Design".
27th Power Sources Symposium Jun. 21-24, 1976, Atlantic City, Jun. 1976, pp. 131-135; W. Luft et al: "Nickel-Hydrogen Battery Packaging Development".
Proceedings of the 25th Intersociety Energy Conversion Engineering Conference-IECEC-90 Aug. 12-17, 1990, Reno, Nevada, vol. 3, Aug. 1990, pp. 1-6; D. E. Nawrocki et al.: "The Hubble Space Telescope Nickel-Hydrogen Battery Design".

*Primary Examiner*—Stephen Kalafut
*Attorney, Agent, or Firm*—Sughrue, Mion, Zinn, Macpeak & Seas

[57] ABSTRACT

The invention relates to a battery of nickel-hydrogen storage cells, which battery includes a baseplate supporting the storage cells, each storage cell being held by a sleeve fixed to the baseplate, the battery further including electrical-protection components for electrically protecting the storage cells, said battery being characterized in that the baseplate (1) includes recesses (2) for receiving the sleeves, the electrical-protection components being disposed between the storage cells. Application to batteries for spacecraft.

9 Claims, 3 Drawing Sheets

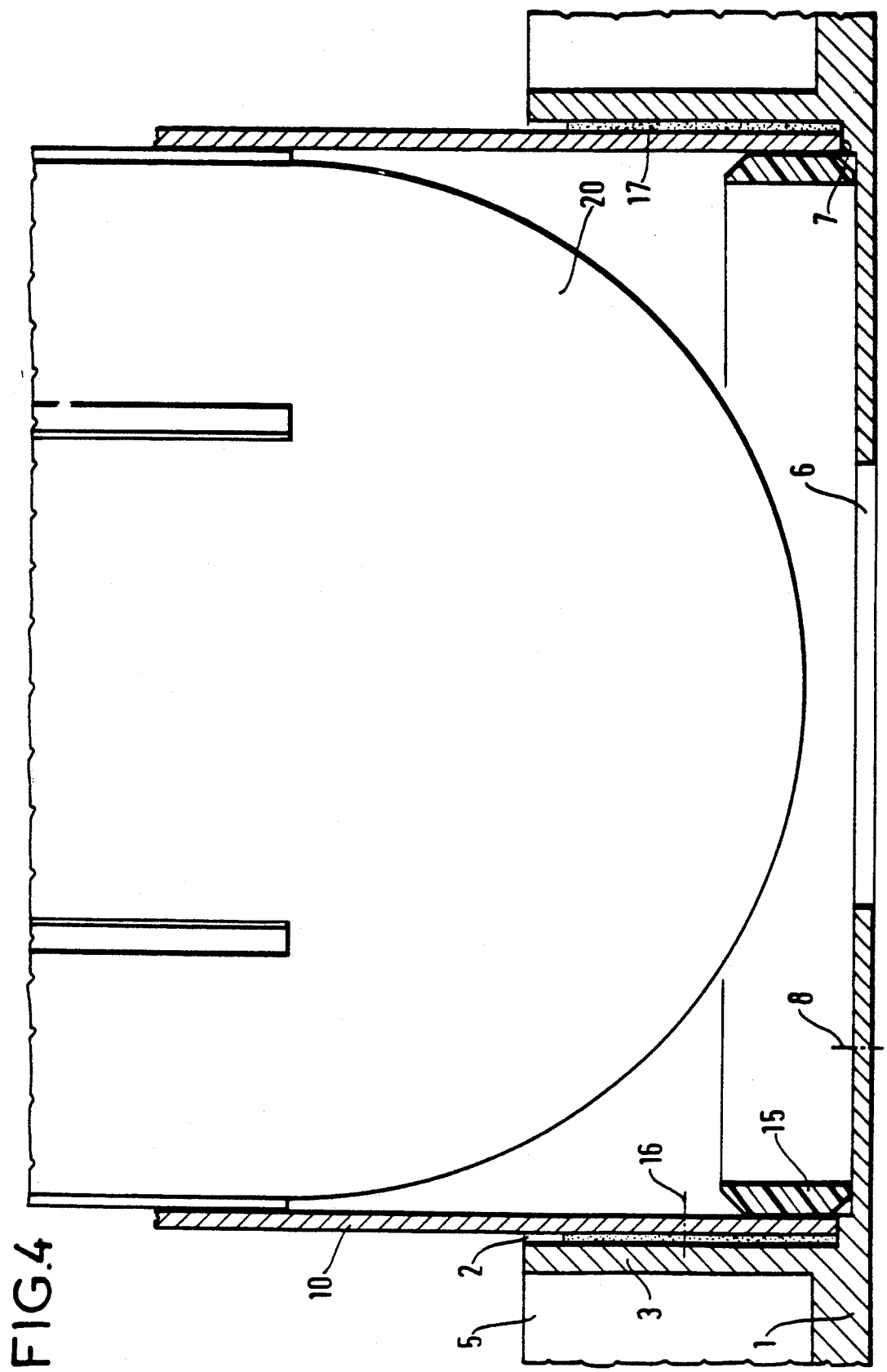

BATTERY OF NICKEL-HYDROGEN STORAGE CELLS

The relates to a battery of nickel-hydrogen storage cells, in particular for use in spacecraft.

Energy per unit volume and energy per unit mass are two fundamental parameters for a space battery. When designing such a battery, care is taken both to minimize its dimensions and to lower its weight as much as possible.

A known battery of nickel-hydrogen storage cells comprises a baseplate which is a metal sheet of thickness lying in the range 3 mm to 4 mm and supporting the storage cells. Each storage cell is disposed in a sleeve equipped with a base enabling the sleeve to be fixed onto the baseplate. If the base is female, it is screwed or riveted onto the baseplate via the top of the baseplate. If the base is male, it is fixed via the underside of the baseplate. That battery of storage cells further includes electrical-protection components connected to the storage-cell terminals and disposed either on top of the storage cells, or else underneath them.

There is a certain amount of flexibility in the baseplate of that battery. This flexibility is compensated for by the mechanical cohesion of the overall battery. The battery must be stiff enough to avoid stressing the satellite wall which is to support it, and which is honeycombed to make it lightweight.

In that battery, since the electrical-protection components are situated above or below the storage cells, overall mechanical cohesion may be provided in the top portion by joints made of adhesive between storage cells, or by mechanical clamping components.

That battery of storage cells is too tall due to the positioning of the electrical-protection components.

An object of the present invention is to mitigate this drawback. To this end, the electrical-protection components are placed between the storage cells, thereby slightly increasing dimensions in the plane of the battery. However, this increase is not really a drawback, since the main aim is to obtain a saving in height. Since the storage cells are disposed further apart, the cohesion of the battery can no longer be provided by joints made of adhesive. In the invention, in order to avoid using an excessively heavy mechanical holding system, the baseplate is given a special shape which enables the baseplate alone to provide the overall cohesion of the battery.

The invention therefore provides a battery of nickel-hydrogen storage cells, which battery includes a baseplate supporting the storage cells, each storage cell being held by a sleeve fixed to the baseplate, the battery further including electrical-protection components for electrically protecting the storage cells, said battery being characterized in that the baseplate includes recesses for receiving the sleeves, the electrical-protection components being disposed between the storage cells.

The invention will be better understood and other advantages and features will appear on reading the following description given by way of non-limiting example made with reference to the accompanying drawings, in which:

FIG. 4 shows how a sleeve is installed on the baseplate.

The outside of a typical nickel-hydrogen storage cell used in space is in the shape of a cylinder terminated at each of its ends by a respective hemisphere. One of the hemispheres carries the two electrical terminals and the filling/emptying pip required for manufacturing the storage cell. The storage cells are held in sleeves for fixing them to the baseplate of the battery.

Figure 1:
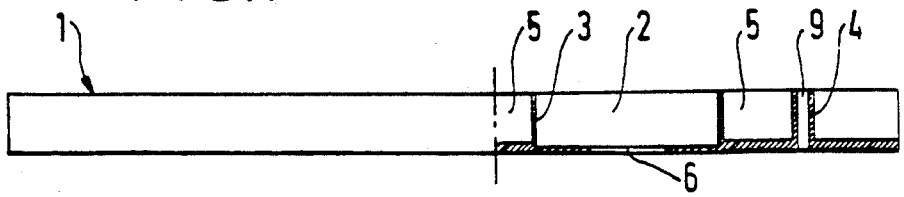
FIG. 1 is a view in fragmentary section and in profile of the baseplate in the battery of storage cells of the invention.
Figure 2:
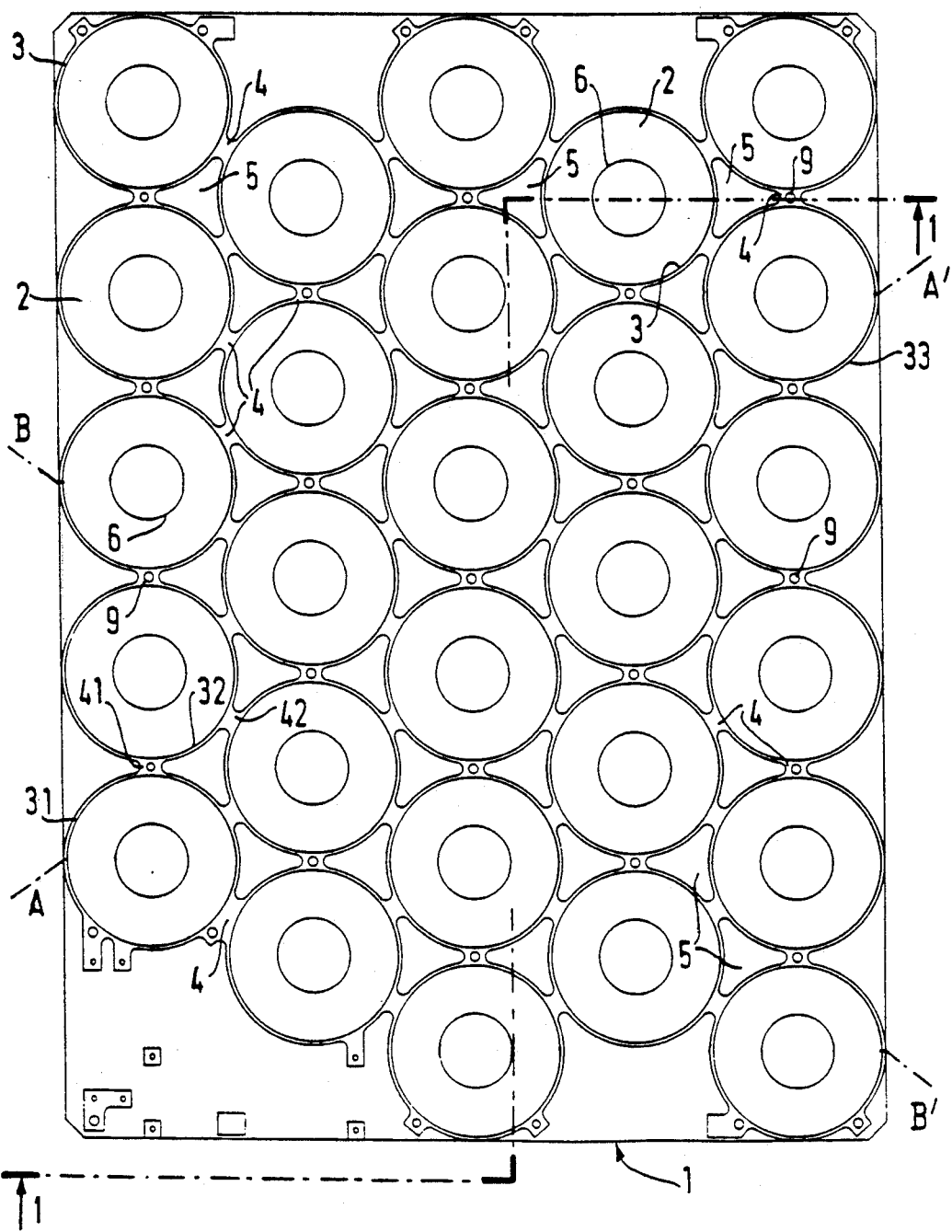
FIG. 2 is a plan view of the baseplate.

FIGS. 1 and 2 are respectively profile and plan views of the baseplate used in the battery of storage cells of the invention. Preferably, the baseplate is made of aluminum for reasons of weight.

The baseplate 1 includes circular recesses 2 provided over most of one of its main faces. Advantageously, the recesses are disposed in a hexagonal pattern and are almost adjacent so as to save as much room as possible. The baseplate 1 is also recessed outside the walls 3 of the recesses so as to leave as little material as possible. However, the walls of the recesses are interconnected via the shortest route by solid portions 4. The solid portions 4 may have the same height as the walls 3 of the recesses, but they are of small mass, so that there is a cavity 5 between every three adjacent recesses. In the embodiment shown in FIG. 1, the bottom of each of the recesses is thinner than the bottom remaining elsewhere. The bottom of each recess has a through central hole 6 large enough to lighten the baseplate further.

If a line AA' is followed as closely as possible, i.e. going via one fourth of wall 31, the solid portion 41, one fourth of wall 32, the solid portion 42 and so on until one fourth of wall 33, it can be observed that a rib is followed. In this way, there are a certain number of ribs parallel to line AA'. The same may be said of line BB' to which a rib corresponds. As above, there are a certain number of ribs parallel to line BB'. Therefore, there are AA'-type ribs crossing with BB'-type ribs. This mesh of ribs considerably reinforces the mechanical strength of the baseplate, and gives sufficient cohesion between storage cells. Each of the storage cells can then be fixed via one end of its sleeve to the baseplate, without any other holding member being necessary.

The baseplate may further include other facilities (not referenced) to enable it to be fixed in a satellite.

The entrance to the recesses is chamfered to facilitate insertion of the sleeves holding the storage cells.

Each of the sleeves is merely a length of tube of circular cross-section and without any specific base, thereby considerably reducing the manufacturing cost of the part, and reducing the overall size of the part to no larger than the outside cross-sectional area of the tube. Low cost is a non-negligible advantage for space uses. Sleeves used in prior art apparatus are of less simple design: they have bases machined so as to be screwed or riveted, or they may each be formed from a sheet rolled up and held together by screws.

In addition to performing a mechanical function, the sleeve has to provide thermal continuity between the storage cells. The operating temperature of the battery must vary only within a very limited temperature range (a few degrees Celsius, e.g. 0° C. to 10° C.), while the outside temperature, close to the battery, may vary in the range $-25°$ C. to $+60°$ C. Furthermore, the battery disturbs the ambient temperature: it heats up when supplying energy and cools down when recharging. There is conventionally a temperature-regulation system on this type of battery. Good thermal continuity between the storage cells is therefore necessary. The sleeve contributes to good thermal continuity by either removing heat or bringing in heat, as required.

Figure 3:
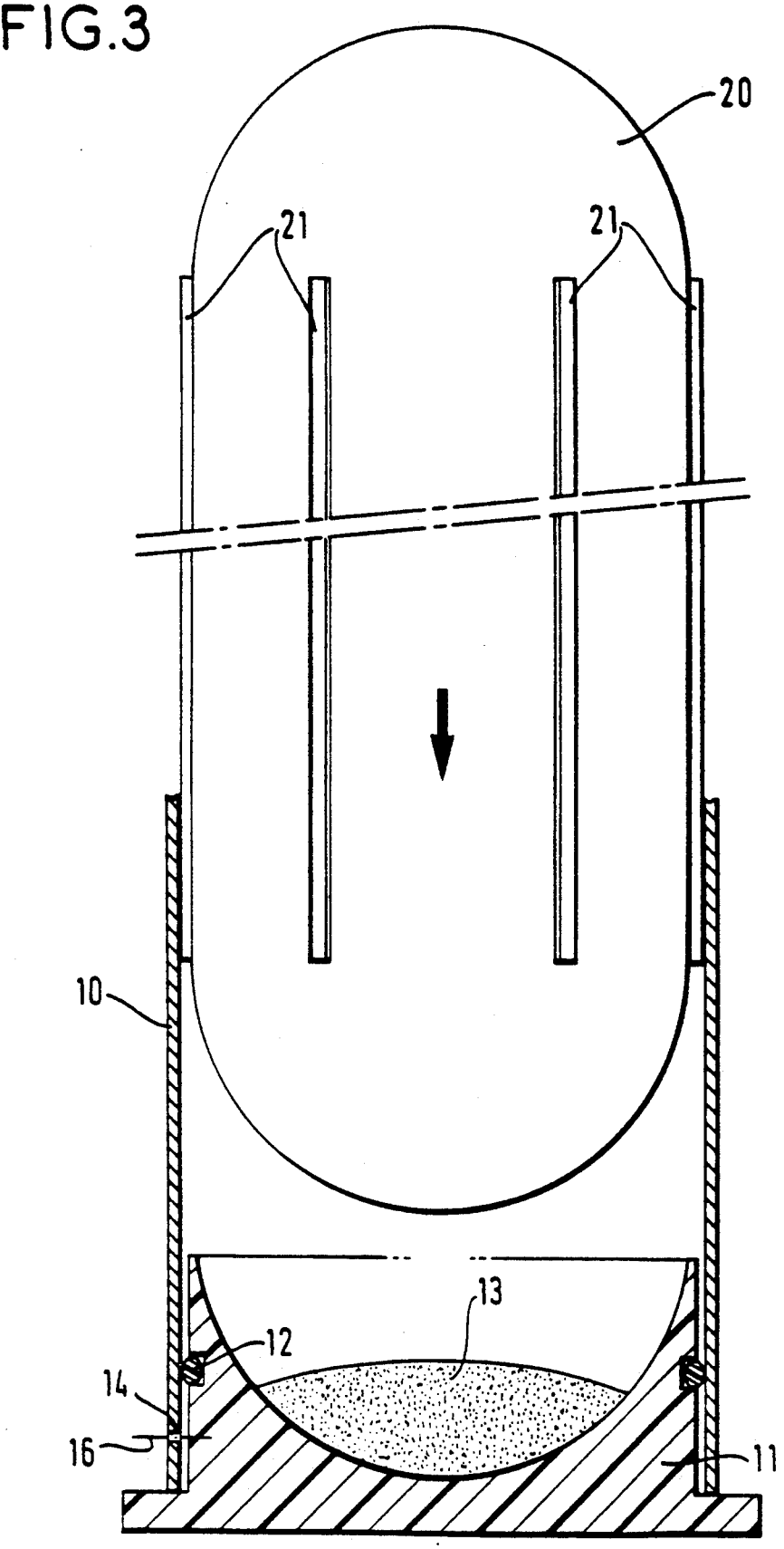
FIG. 3 shows how a storage cell is mounted in its sleeve in the disposition of the invention.

The storage cells are mounted in their sleeves before being fixed onto the baseplate. Mounting may be performed as shown in FIG. 3. One end of the sleeve 10 is closed by a hollow hemispherical stopper 11 corresponding to the hemisphere terminating the storage cell. A sealing ring 12 is disposed in a peripheral groove in the stopper to provide sealing between the sleeve and the stopper. A little mound of adhesive 13, e.g. the resin sold under the trademark "Solithane C 113", is provided on the hemispherical bottom of the stopper. The storage cell 20 is equipped with fine centering strips 21 uniformly disposed around and glued onto the periphery of the cylindrical portion of the storage cell and parallel to the axis of the storage cell. The strips may be made of a material such as the material sold under the trademark "Kapton", and they may be disposed at 60° intervals about the axis of the storage cell. They may have a thickness of 0.1 mm. The storage cell as equipped with its strips fits snugly inside the sleeve. By pushing the storage cell down into its sleeve as shown in FIG. 3, the resin rises up into the space separating the sleeve from the cylindrical portion of the storage cell. Since the hemisphere of the storage cell fits the corresponding portion of the stopper, all the resin is forced to rise. The stopper is then withdrawn and the resin is polymerized. In this way, a bubble-free coating of adhesive is obtained. This is important for providing both good heat conduction between the sleeve and the storage cell, and good electrical insulation. The terminal at one end of an electrical wire can then be fixed inside the sleeve and under the storage cell by means of a flat head screw which is housed in a hole 14. The sleeves are assembled onto the baseplate by glueing. A film of glue of about 0.3 mm in thickness is disposed between the outside skin of the bottom portion of the sleeve and the inside skin of the recess in the baseplate.

Installing a sleeve on the baseplate is shown in FIG. 4. Firstly, a centering ring 15 made of space quality plastic is placed at the bottom of the recess 2. The ring is centered by means of the ledge 7 at the bottom of the recess. Before the sleeve 10 holding the storage cell 20 is installed, the ground wire for electrically connecting the sleeve to the baseplate is fixed. The ground wire is connected firstly to the sleeve via a flat head screw housed in the hole 14 (see FIG. 3) and a nut, and secondly to the baseplate via a screw fixed at the bottom of the recess. The points at which the ground wire is fixed are represented symbolically by axis 16 for the sleeve (the axis of the hole 14), and axis 8 for the baseplate.

Before the sleeve is pushed into its recess, the groove between the centering ring 15 and the wall 3 of the recess is filled with adhesive. The sleeve is then pushed into the recess. The inside diameter of the sleeve is equal (ignoring clearance) to the outside diameter of the centering ring. The adhesive then rises up between the centering ring and the wall 3 of the recess to constitute a bubble-free coating 17. The adhesive may be of the same type as the adhesive used for glueing the storage cell into its sleeve. A small countersunk portion may be provided at the top of the recess to collect any surplus adhesive.

The electrical-protection components for electrically protecting the storage cells (e.g. diodes) may be fixed in the cavities 5 by screws via small supports (one per storage cell). The electrical-protection components are then connected to the storage-cell terminals via wires.

The battery is fixed to the wall of the satellite by screws passing through the baseplate via through holes 9 in certain solid portions 4.

By way of example, the depth of a recess may be 29 mm for an inside diameter of 92 mm and a wall-thickness of 2 mm.

I claim:

1. A battery of nickel-hydrogen storage cells, which battery includes a baseplate supporting the storage cells, each storage cell being held by a sleeve fixed to the baseplate, the battery further including electrical-protection components for electrically protecting the storage cells, said battery being characterized in that the baseplate (1) includes recesses (2) for receiving the sleeves (10), the electrical-protection components being disposed between the storage cells (20).

2. A battery according to claim 1, characterized in that the recesses (2) are disposed in a hexagonal pattern.

3. A battery according to claim 1, characterized in that the bottoms of the recesses (2) have through holes.

4. A battery according to claim 1, characterized in that walls of the recesses are interconnected via solid portions.

5. A battery according to claim 1, characterized in that the electrical-protection components are disposed in cavities (5) in the baseplate, which cavities are disposed between the recesses.

6. A battery according to claim 1, characterized in that the sleeves (10) are lengths of tube.

7. A battery according to claim 1, characterized in that each of the storage cells (20) is held in its sleeve by means of a coating of adhesive.

8. A battery according to claim 1, characterized in that each of the sleeves (10) is fixed in its recess (2) by means of a coating of adhesive (17).

9. A battery according to claim 1, characterized in that each sleeve (10) is centered in its recess (2) by means of a ring (15).

* * * * *